United States Patent [19]

Campbell et al.

[11] 3,819,399

[45] June 25, 1974

[54] TREATING METAL CLAD STEEL WIRE FOR APPLICATION OF ORGANIC ADHESIVE

[75] Inventors: Robert Henry Campbell; Charles Phillip Rader; Robert Lee Wright, all of Akron, Ohio

[73] Assignee: Monsanto Company, St. Louis, Mo.

[22] Filed: July 26, 1972

[21] Appl. No.: 275,202

[52] U.S. Cl.................. 117/49, 117/49, 117/79, 117/119.6, 117/128.4, 117/128.7, 156/124
[51] Int. Cl....... B44d 1/42, B44d 1/48, C03c 25/02
[58] Field of Search....... 117/49, 128.4, 128.7, 232, 117/233, 79, 133, 161 A, 162, 163, 52, 75, 119.6, 50, 8; 156/18, 124

[56] References Cited

UNITED STATES PATENTS

| | | | |
|---|---|---|---|
| 2,078,910 | 4/1937 | Merrill | 117/79 |
| 3,342,647 | 9/1967 | Coe | 117/75 |
| 3,677,809 | 7/1972 | Klement | 117/79 |
| 3,677,950 | 7/1972 | Alderuccio | 156/18 |

*Primary Examiner*—Charles E. Van Horn
*Assistant Examiner*—Michael W. Ball

[57] ABSTRACT

In the application of organic adhesive to metal, steel wire coated with a different metal is passed serially through treating zones, in one of which an entire surface layer of the coating metal is removed and in a subsequent zone an organic adhesive is applied.

8 Claims, 1 Drawing Figure

PATENTED JUN 25 1974　　　　　　　　　　　　3,819,399

TREATING METAL CLAD STEEL WIRE FOR APPLICATION OF ORGANIC ADHESIVE

FIELD OF THE INVENTION

This invention relates to the metal treating art. More particularly, it relates to the treatment of steel wire clad with a different metal in preparation for application of an organic adhesive. Still more particularly, the invention relates to the combination of treating steel wire coated with a non-ferrous metal to remove an entire surface of the coating metal and coating with an organic adhesive.

BACKGROUND OF THE INVENTION

Wire is usually produced by a drawing process. For the preparation of metal tire cord, high tensile steel wire is required and to obtain the necessary high tensile strength, the steel is usually cold drawn. The cold drawing process is desirably facilitated by the use of lubricant or drawing adjuvant to minimize wear of the dies which drawing adjuvant may include a metal softer than steel, for example, copper, copper alloy or zinc applied as a coating on the steel. Metal drawing adjuvants, particualrly copper and its alloys, have capability of adhering strongly to rubber. Accordingly, steel tire cord for reinforcing components of pneumatic tires is commonly brass-coated wire. The brass of brass-coated steel fiber used for making steel tire cord, carefully compounded for optimum adhesion to the rubber, serves the dual purpose of die lubricant for final drawing of the wire and adhesive for the drawn steel wire.

Unfortunately, there are serious shortcomings and disadvantages of brass-coated steel for manufacture of reinforced rubber articles. Adequate adhesion is not consistently obtained and the rubber article is subject to sudden and unexplained adhesion failures. The factors which contribute to the nonuniformity of brass adhesion probably stem from the mechanism of brass to rubber adhesives believed to involve reactions between brass and sulfur and between sulfur and rubber so that proper balancing of these reactions is required. Thus, the adhesion of brass to rubber is a function of the rubber composition in which the wire is embedded and the composition of the rubber may vary. The adhesion is particularly a function of the vulcanizing system for the rubber and variations in the system may contribute to erratic adhesion performance. Adhesion of brass to rubber is also a function of the surface condition of the brass which surface may vary due to oxidation or contamination by amines and other extraneous materials in the atmosphere commonly found around rubber shops. Rapid oxidation is a characteristic of copper and its alloys and some difficulties of adhering rubber thereto have been traced to surface oxidation. Thus, brass-plated tire cord must be promptly protected from atmospheric exposure. A further disadvantage of brass-coated wire is that adhesion is influenced by the composition of the brass which must be carefully controlled and the adhesive bond deteriorates with age.

Organic adhesives have been developed which are capable of adhering strongly both to rubber and metal and thereby uniting the rubber and metal in the composite structure. It has been recognized that organic adhesives are capable of generating a strong bond between the organic adhesive and rubber and one which is more consistent and uniformly reproducible than the bond between brass and rubber. Use of organic adhesive on metal cord in reinforced rubber articles has the advantage that the strands and filaments are bound to each other by the adhesive as well as to the rubber. Although brass is capable of forming very strong bonds, the greater uniformity of the bonds produced by organic adhesives has been recognized and is well documented.

In the manufacture of reinforced rubber articles from reinforcing wire clad with a drawing adjuvant, there remains a need for reducing or eliminating the variability of adhesion induced by variables of rubber formulation, of metal coating formulation and of atmospheric contaminants. Heretofore, the adoption of organic adhesives has generally been regarded as a replacement for the brass plating line. Our application of organic adhesives to brass-plated tire cord and incorporation of the plated cord into rubber has generally resulted in essentially the adhesion values of brass to rubber. It appears that even from brass coated with organic adhesive the bonding to the rubber may involve the reactions and mechanisms which form the rubber to brass bond and may be subject to the same variations as before. In any event, the reliability of the bond between any organic surface and metal appears to depend upon the condition of the surface of the metal. Various treatments of metal surfaces to improve the quality of the bond with another surface have been proposed. Such treatments include degreasing, mechanical abrasion, chemical etching and chemical pickling. The present invention relates in part to improvements in treating metal surfaces for application of organic adhesion.

SUMMARY OF THE INVENTION

According to this invention, metal clad steel wire is treated to prepare it for application of organic adhesive by removing an entire layer of the surface coating in one area of a treating zone followed by immediate application of organic adhesive in another area of the treating zone. Steel wire coated with a different metal is passed through a treating zone in contact with an agent which removes metal coating, the time of contact being of sufficient duration to remove an entire surface layer of the coating metal. It has been found that reaction of agents for dissolving metal coating is a very fast one, making complete rejuvenation of the surface feasible. Brass surfaces which have become worthless for making composites because of poor adhesion may be restored to serviceable condition and maintained by coating with organic adhesive. However, it is preferred to expose the substrate. This exposure provides a convenient control means to assure that an entire surface layer of the coating metal is removed. Moreover, ferrous metal is a preferred base metal for application of organic adhesive. It is feasible to treat the individual brass-coated steel wire filaments; to treat strands formed from twisting a number of such filaments together or to treat brass-coated cord or cable formed by twisting together a number of the aforesaid strands. The invention is especially applicable to treatment of wire in the form of brass coated drawn steel tire cord. Upon exposure of the base metal at the cord surface, brass remains in the interstices of the cord and is available to function as a lubricant for the individual strands and filaments within the composite rubber structure.

The treatment in preparation for application of organic adhesive is serially combined with the step of applying organic adhesive into a unitary process which process comprises passing metal clad steel wire through a compartmentalized treating zone. In one compartment, wire is brought into contact with an agent for removing the metal surface, and in a subsequent compartment, the wire is brought into contact with an organic adhesive and coated therewith. The process reduces or eliminates the vagarious effects described above.

There is evidence that the adhesion of debrassed tire cord to which the organic adhesive is applied is superior to the adhesion obtained by applying the same adhesive to a similar base metal. This may be due to a more active surface condition. Wire intended for use in drawing operations is coated with a layer of metal before it is reduced to its final diameter by drawing. The cover metal protects the steel surface during the drawing operation. Since the surface layer at the interface between the steel and cover metal increases as the wire is drawn, there is a significant reduction in the concentration of contaminants on the steel surface. After treating the wire to remove the covering layer of metal, the freshly exposed steel is conductive to strong adsorption of adhesive. In the interrelated combinations of surface preparation and application of organic adhesive in a more or less continuous unitary operation, the organic adhesive is applied to the fresh metal surface before the quality of the surface deteriorates. Once the adhesive is applied, the surface of the substrate is protected from further deterioration.

Examples of metals suitable for the substrate are low and high carbon steel and stainless steel. The cladding metal may be copper, zinc, tin or alloys thereof. Zinc or tin may be deposited upon a substrate by electroplating, however, a common method comprises dipping into a molten bath of the metal. In the case of copper or copper based alloy, the metal is deposited on the substrate by chemical- or electro-deposition. The commonly used copper alloy, brass, is an alloy of a major portion of copper and a minor portion of zinc. A typical brass composition formulated for adhesion to rubber comprises about 70% copper and about 30% zinc. Steel wire is normally subjected to rigorous chemical treatment to prepare its surface prior to application of the cladding layer. Then the metal-clad wire is reduced to its final diameter by drawing. The drawing generally effects a two-fold or more reduction in diameter, for example, a 40 mil wire is drawn to a final diameter of 6 mil.

The reagents used to remove the protective layer of metal from the surface of the wire are conventional. It was found that certain of these dissolve the metal coating layer quickly so that the process can be operated continuously at a reasonable rate. The reagents which dissolve the metal coating should not severely attack the base metal nor form a residue which interferes with adsorption of the adhesive. Any reagent which oxidizes the metal to a salt which is soluble in the treating solution is suitable for the process. Aqueous ammonium persulfate, ammoniacal hydrogen peroxide and ammoniacal trichloroacetic acid are examples of suitable decladding solutions. Dilute oxidizing acids such as nitric acid will remove the metal cladding from the metal substrate but care must be taken to avoid excessive etching of the base metal. Another satisfactory decladding solution comprises 50 parts concentrated hydrochloric acid, 20 parts ferric chloride and 30 parts water. A preferred reagent is ammoniacal ammonium persulfate solution wherein the proportion of the ammonia ($NH_3$) to ammonium persulfate is about 2/1 on a weight basis. However, other ammonia/ammonium persulfate ratios are suitable. Concentrations of ammonium persulfate solutions of 0.5–30 percent are recommended with 1–5 percent solutions preferred. The ammonium persulfate reacts stoichiometrically with the metal which means additional persulfate must be added from time to time as it becomes depleted. An exposure of a few seconds to ammoniacal ammonium persulfate solution is sufficient to completely remove the brass from a drawn brass-plated steel monofilament wire. The temperature of the decladding solution is usually at room temperature but may vary from 0°–100°C as desired. An advantage of the process and of the use of ammoniacal ammonium persulfate decladding solution is that the metal values may be salvaged.

An alternative procedure for removal of the metal coating on steel comprises electrolytic stripping of cyanide soluble metals. The process is the opposite of the plating operation and is achieved by reversing the direction of the current flow. Typically, a brass plating solution may be used for the simultaneous removal of the brass coating and plating of brass on a cathode for recovery or plating directly upon another cord. A 5% sodium cyanide solution is recommended for general purpose electrolytic stripping baths. Additions of sodium hydroxide to the cyanide solution is beneficial when stripping brass by the anodic cyanide treatment. Voltages of 1–6 volts and current densities of 10–20 amp./ft.$^2$ are satisfactory for removing thin brass plating from steel in times of 60 seconds or less. Higher solution temperatures enhance the stripping rate. Procedures for electrolytic stripping are described in Metal Finishing 56, p. 60 (1958).

Any rubber-to-metal organic adhesive is suitable for the practice of this invention. Aqueous organic adhesive systems are preferred especially for reasons of versatility, economy, ease of application and safety. Resorcinol-formaldehyde resin latex commonly called RFL may be used alone or in conjunction with phenol-formaldehyde resin primers. Generally, for best overall prformance, the RFL is formulated with an aqueous adhesive adjuvant. Examples of suitable water soluble adjuvants or adhesives which may be used with or without RFL are the (1) reaction product of resorcinol and dimethylol-p-chlorophenol, Belgian Pat. No. 388,424, British Polymer Journal 3, 58 (1971); (2) the reaction product of resorcinol, triallyl cyanurate and formaldehyde U.S. Pat. No. 3,318,750 (3) alkylene-resorcinol polymer formaldehyde resin, Belgian Pat. No. 770,683, and (4) amine-imide-epoxy adhesives, Canadian Journal of Chemistry 45, 2613 (1967). Aqueous emulsion adhesive systems containing blocked polyisocyanates are also suitable, Adhesive Age, February, 1959, p. 30. Organic soluble adhesive systems may also be used, for example, brominated chlorobutadiene adhesives which are sometimes formulated separately or in combination with polyisocyanates, chlorinated rubber and nitroso aromatic compounds, U.S. Pat. Nos. 2,900,292 and 3,258,388–9. All of the aforesaid examples are commercially available types. The organic adhesive may be applied by any of the conventional methods such as dipping, brushing or spraying. It is recommended that the amount of organic adhesive applied is sufficient to substantially cover the surface. In the case of steel cord, the amount of adhesive applied is about 0.5–2.0 weight percent. Variables which affect the amount of pick-up on the cord are: Cord construction, the percent solids in the adhesive dip composition, viscosity of the dip composition, the residence time of the cord in the dip, cord speed, cord tension, pH and temperature. The effect of these variables and methods for controlling the amount of pick-up are familiar to those skilled in the art of rubber adhesion processes.

The treated cords are suitable for bonding to diene rubber, and bonding is effected by vulcanizing the rubber composite. Any sulfur-vulcanizable diene elastomer including natural and synthetic rubber and mixtures thereof are suitable for making reinforced composite structures from the wire produced by the process of the invention. Suitable synthetic rubbers include cis-4-polybutadiene, butyl rubber, ethylene-propylene terpolymers, polymers of 1,3-butadiene, polymers of isoprene, copolymers of 1,3-butadiene with other monomers, for example, styrene, acrylonitrile, isobutylene and methylmethacrylate. The rubber composition may contain the usual compounding ingredients such as extender oil, reinforcement pigments, phenolic antidegradants, amine antidegradants and accelerating agents.

Typically, a drawn metal-clad wire is passed through a solution which removes the metal layers and exposes the substrate. The residence time varies from a few seconds to 2 to 3 minutes depending upon the concentration and nature of the treatment solution and the thickness of the metal layer. If a water-based adhesive is used, it is not necessary to dry the specimen before applying the adhesive; however, if an adhesive system which is incompatible with water is used, the wire is dried before applying the adhesive. In either situation applying the adhesive is combined in series with forming a new surface in order to prevent deterioration of the freshly exposed surface. Any change in the nature of the surface degrades the quality of the subsequently formed rubber-metal bond. When using a latex-based adhesive composition, it is recommended to rinse the treated wire with water before applying the adhesive to remove salts which may coagulate the latex of the adhesive. After application of a thermosetting adhesive, the adhesive-coated wire is heated to promote bond formation between the metal and adhesive and promote cross-linking within the adhesive itself. Cross-linking increases the molecular weight of the adhesive to a range conducive to bonding with the rubber. The conditions of heat treatment vary from adhesive to adhesive but will generally be a temperature within the range of 200°–550°F for times of a few seconds to several minutes. Non-thermosetting organic adhesives are generally applied in an organic solvent and after application of such an adhesive from organic solvent the coated wire is heated to evaporate the solvent.

The process is particularly applicable to wire because it is convenient via a series of pulleys and spools to continuously advance the wire through the various stages of the operation. When treating wire cord made of steel filament clad with a different metal it is only necessary to remove the metal from the periphery of the cord to achieve the advantage of rubber to steel adhesion since the portions of the twisted strands within the interior of the cord do not significantly contribute to adhesion. However, if complete removal of cover metal is desired it is conveniently achieved by extending the time in the bath for removal of the metal. The treatment time varies from cord to cord depending upon the geometry of the cord, thickness of the metal layers and the concentration, temperature and type of treatment solution. Treatment time of a few seconds are sufficient for complete removal of 10–10,000 Angstrom thick metal layers from monofilament of the periphery of cord whereas times of 3 minutes or greater may be required for complete removal of metal within the interior of the cord.

In one embodiment of the invention, drawn brass-plated steel tire cord is treated at room temperature for about 30 seconds with a 2–3 percent ammoniacal ammonium persulfate solution. The treatment removes the brass from the periphery of the cord without removing the brass from the portion of the twisted strands which are within the interior of the cord. The cord is then coated with adhesive as described above. The method, besides providing more consistent adhesion over ordinary brass-plated cords, offers the additional benefit that the brass remaining in the interior of the cord serves as a lubricant which reduces the friction between the strands as the cord flexes when the tire rolls. The reduced friction decreases the wear between the strands thereby extending the life of the cord and also decreases the amount of heat generated thereby reducing the heat degradation of the rubber.

FIG. 1 is a schematic drawing of apparatus suitable for carrying out the process.

DESCRIPTION OF PREFERRED EMBODIMENTS

Figure 1:
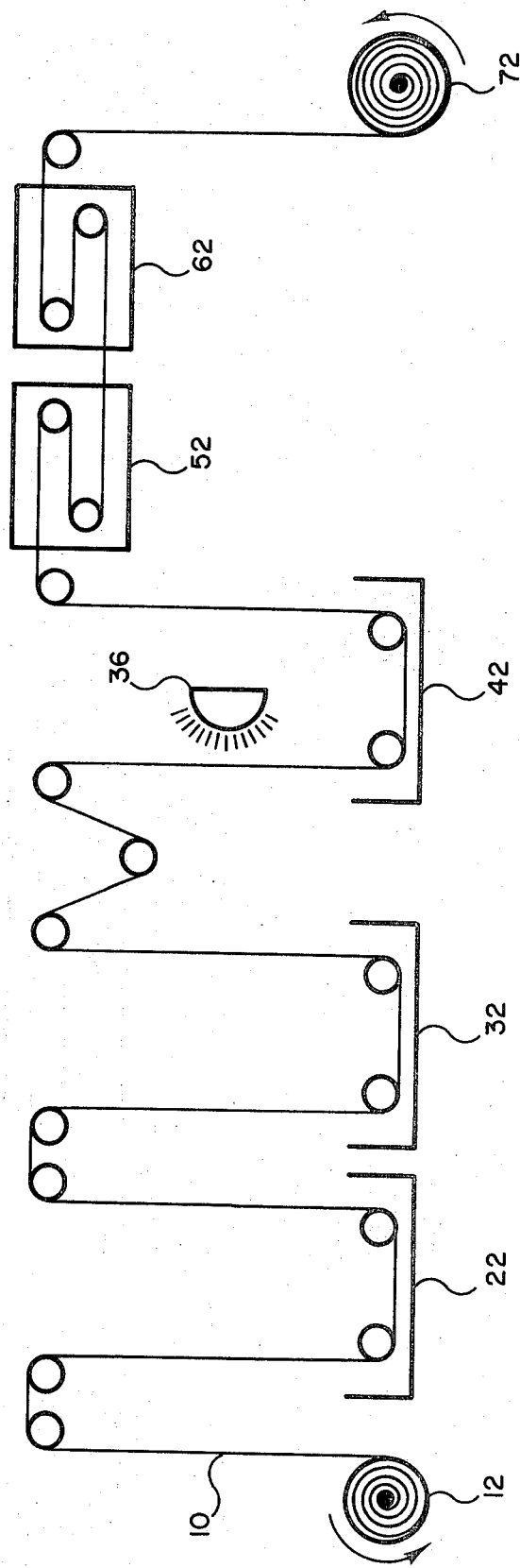

The process is readily carried out in a continuous operation with each step conducted in sequence. To illustrate the invention, standard Litzler textile treating equipment is used. Brass-plated steel tire cord is fed from spools into the equipment at one end and at the other end spooled debrassed adhesive-coated cord is obtained. The equipment consists of a series of treating tanks and ovens along with a means for advancing the cord through the equipment. As the cord advances, it first enters a tank containing debrassing solution. From the debrassing tank the cord passes through a rinse tank containing water which removes residual quantities of debrassing solution and metal salts. Excess water is removed from the cord by allowing the cord to pass over a series of pulleys thorugh ambient air. Heat may be applied at this stage to remove residual amounts of moisture, if necessary. The cord next enters a tank containing the organic-adhesive. As the cord leaves the adhesive dip tank, it passes through two ovens. The first oven dries the cord and the second oven is operated at higher temperature to thermoset the adhesive. For water-based adhesives the two-stage heat treatment is recommended so that the water is removed prior to the thermosetting step. For non-thermosetting adhesives, only the first oven is operated to evaporate the solvent.

In FIG. 1 the unshaded circles represent pulleys through which the wire is threaded. The wire 10 is fed from supply spool 12 into debrassing tank 22 which contains debrassing solution. As the wire advances, it enters rinse tank 32 through which fresh water is constantly flowing. From the rinse tank the wire passes by optional heat source 36. The wire next enters adhesive dip tank 42 containing the organic adhesive. As the wire leaves the adhesive dip tank, it passes through drying oven 52 and from the drying oven, the wire enters thermosetting oven 62. The adhesive-coated wire is recovered on take-up spool 72. Not shown in the drawing are means for advancing the wire and means for controlling the tension on the wire.

A debrassing solution is prepared by combining 285 parts concentrated ammonium hydroxide (28% $NH_3$), 40 parts ammonium persulfate and 1,275 parts water for a total of 1,600 parts. The rate of brass removal is dependent on ammonium persulfate concentration. At the described concentration, residence times of ten seconds are sufficient to completely remove the brass from the periphery of standard brass-plated tire cord. As the debrassing operation proceeds it is necessary from time to time to replenish the ammonium persulfate which has been depleted by reaction with the brass.

A metal adhesive dip composition is prepared according to the procedure described in Belgium Pat. No. 770,688 and the process is illustrated with the above debrassing and adhesive compositions by passing brass-plated drawn steel tire cord through the apparatus of FIG. 1 at the rate of about 30 ft./min. with the cord under tension of about 3–4 pounds. In the debrassing zone the brass is removed from the periphery of the cord and the substrate exposed. The operating parameters at various zones are as follows:

| Treating Zone | Residence Time, Seconds | Temp., °C |
|---|---|---|
| Debrassing tank | 23 | 30–35 |
| Rinse tank | 30 | 25 |
| Dewatering | 80 | 25 |
| Adhesive dip tank | 4 | 25 |
| First oven | 19 | 100 |
| Second oven | 60 | 180 |

The amount of adhesive retained on five spools of tire cord treated in this manner varies from 1.0–1.4 weight percent with the average of 1.2 weight percent on 1 × 5 × 0.010 inch tire cord and varies from 0.8–1.0 weight percent with the average of 0.9 weight percent on 1 × 4 × 0.0087 inch tire cord.

The treated cords are incorporated into rubber and evaluated for adhesion. Three tests are used to evaluate the adhesion between the treated cord and rubber. One test is called an H-test and derives its name from the shape of the rubber-cord article formed in the vulcanization mold. The coated or dipped cord is embedded in rubber which is placed in a conventional H-test vulcanization mold having rubber strip channels three-eighths-inch wide by 0.1 inch deep and separated from one another by one-fourth-inch. The test specimens are placed in the mold and heated at 307°F for the time required to obtain optimum cure. The test specimens are removed, cooled to room temperature and permitted to relax or to set for 24 hours. The specimens are then heated for one hour before the force to separate the cord from the rubber is determined at 100°C. An aged specimen is one which has been heated for 24 hours at 100°C before measuring at 100°C the strength of the bond between the cord and the vulcanized rubber. The force required to separate a cord from the rubber in an H-test specimen is determined by use of an Instron tensile tester with a jaw speed of the tester moving at the rate of 5 inches per minute.

Another test which measures the force required to pull a cord from vulcanized rubber is called a Harp test which test essentially follows the procedure of ASTM–D–2229 with minor modifications. Three adhesive treated cords are embedded perpendicular to a longitudinal surface of a strip of rubber one-half inch wide and one-half inch thick and the composite is vulcanized to optimum cure. The specimen is anchored by the two outer cords and the force required to pull the center cord from the rubber at room temperature is determined by an Instron tester with a jaw speed of 5 inches per minute.

The third test called a peel-test comprising measuring the force required to separate a ply of cords from an adjacent layer of rubber. A specimen is prepared by forming two parallel plies of parallel cords of about 20 cords per inch separated by a 15 to 20 mil thick sheet of the desired rubber stock. Pieces of the same stock, 60 mils thick, are applied to each side of the aforementioned three-layered composite. Pieces of rubberized fabric are then applied to form the outside layers completing the test specimen. Thus, the test specimen comprises, from top to bottom,, a rubberized fabric layer, a 60 mil rubber layer, a cord layer, a 15–20 mil rubber layer, a cord layer, a 60 mil rubber layer and a rubberized fabric layer. The specimen is vulcanized in an appropriate mold in a press to optimum cure. The cured specimen is cut parallel to the cords into one-inch wide strips. The force required to peel one cord ply from the other cord ply is determined at 120°C by use of an Instron tester with a jaw speed of 8 inches per minute. In all of the above tests, two or more measurements are made and the average value obtained for all the determinations is recorded.

Three different rubber formulations which are used to illustrate the invention are shown below. Stock A is a natural rubber stock formulated to give good brass adhesion. Stock B exemplifies a typical formulation used for preparing organic fiber composites. Stock C illustrates a stock which gives poor adhesion with brass primarily because of the use of an ultra accelerator. All parts are by weight.

|  | Stock A | Stock B | Stock C |
|---|---|---|---|
| Natural Rubber | 100.0 | 50.0 | 50.0 |
| Oil extended SBR | — | 68.8 | 68.8 |
| HAF Carbon Black | 50 | — | — |
| FEF Carbon Black | — | 50 | 50 |
| Zinc Oxide | 5 | 3 | 3 |
| Stearic acid | 3 | 2 | 2 |
| Naphthenic processing oil | 3 | — | — |
| Aromatic processing oil | 2 | — | — |
| Polymerized 1,2-dihydro-2,2,4-trimethylquinoline | 2.5 | | |
| Sulfur | 3 | 2 | 2.5 |
| N-tert-butyl-2-benzothiazole-sulfenamide | — | 1 | — |

-Continued

|  | Stock A | Stock B | Stock C |
|---|---|---|---|
| 2-(Morpholinothio)benzothiazole | 0.8 | — | 0.6 |
| N-(Cyclohexylthio)phthalimide | 0.5 | — | — |
| Tetramethyl thiuram disulfide | — | — | 0.3 |
| TOTAL | 169.8 | 177.8 | 177.2 |

The stocks are cured at 307°F; stock A for 30 minutes, Stock B for 35 minutes, and Stock C for 25 minutes. The results obtained in the above experiments with two different cord sizes are shown in Tables I, II and III below. An acetone washed brassed cord taken from the same spool used for debrassing is used as a control in each instance. The adhesion values shown are average values obtained from two or more measurements.

TABLE I

H-TEST, lbs.

| | STOCK A | | | |
|---|---|---|---|---|
| | 1 × 5 × 10 mil | | 1 × 4 × 8.7 mil | |
| | unaged | aged | unaged | aged |
| Debrassed Cord plus organic adhesive | 40.1(60.5)[a] | 40.2(52.1) | 55.5(47.2) | 46.9(39.2) |
| Brassed Cord (control) | 32.1(45.1) | 22.0(30.9) | 39.4(37.5) | 28.2(26.6) |

| | STOCK B | | | |
|---|---|---|---|---|
| | 1 × 5 × 10 mil | | 1 × 4 × 8.7 mil | |
| | unaged | aged | unaged | aged |
| Debrassed Cord plus organic adhesive | 55.3(58.3) | 51.5(43.4) | 51.8(46.1) | 41.3(37.5) |
| Brassed Cord | 25.1(57.7) | 14.0(30.1) | 13.1( 9.0) | 6.3( 4.4) |

| | STOCK C | | | |
|---|---|---|---|---|
| | 1 × 5 × 10 mil | | 1 × 4 × 8.7 mil | |
| | unaged | aged | unaged | aged |
| Debrassed Cord plus organic adhesive | 32.2(32.8) | 23.9(27.4) | 28.8(24.5) | 22.1(18.5) |
| Brassed Cord | 3.2( 3.4) | 3.7( 4.5) | 5.2( 4.3) | 4.1( 3.6) |

TABLE II

Harp Test

| | STOCK A | | | |
|---|---|---|---|---|
| | 1 × 5 × 10 mil | | 1 × 4 × 8.7 mil | |
| | lbs. | % Cords Broken | lbs. | % Cords Broken |
| Debrassed Cord plus organic adhesive | 100.1(108.0) | 8(14) | 76.2(65.0) | 58(14) |
| Brassed Cord | 71.8 | 0 | 62.2 | 29 |

| | STOCK B | | | |
|---|---|---|---|---|
| | 1 × 5 × 10 mil | | 1 × 4 × 8.7 mil | |
| | lbs. | % Cords Broken | lbs. | % Cords Broken |
| Debrassed Cord plus organic adhesive | 107.9(102.6) | 17(14) | 74.3(81.3) | 54(29) |
| Brassed Cord | 61.7 | 0 | 37.9 | 0 |

[a]Data in parentheses are results obtained in duplicate experiments.

TABLE III

| | Peel test, lbs./in. | |
|---|---|---|
| | 1 × 5 × 10 mil | |
| | Stock A | Stock B |
| Debrassed Cord plus organic adhesive | 53 | 37 |
| Brassed Cord | 43 | 33 |

The data show that the process of the invention yields a product which gives in general higher adhesion values than commercial brassed cord in a series of stocks, particularly improved aged adhesion, and demonstrate that the product of the invention is less sensitive to rubber formulation than brass-coated cord. Essentially, the same results are obtained when the process is repeated using zinc-plated tire cord or other rubber-to-metal organic adhesives. Equally good adhesion is obtained by the process of the invention using a brassed cord which had deteriorated to the point that the cord would not adhere to rubber.

Although the invention is illustrated above with a single station for application of organic adhesive, the adhesive compartment may comprise two or more stations for applying organic adhesive. For example, for certain adhesive systems commonly called two-dip systems, there are two separate dip tanks containing different adhesive compositions through which the declad cord is serially passed. With certain two-dip systems, a heating oven is also situated between the two adhesive tanks. In the case of either simple or complex compartments for application of adhesive, the process of the invention is applicable. Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. The process of applying organic adhesive to metal cord which comprises serially passing cord formed of steel wire filaments coated with copper, zinc, tin or alloys thereof through a compartmentalized treating zone, removing in a first zone the coating metal from the periphery of the cord to form a cord having an exposed steel periphery and having coating metal remaining in the interstices and in a second zone coating said cord having an exposed steel periphery with organic adhesive.

2. The process of claim 1 in which the cord is drawn steel, the coating is a wire drawing agent.

3. The process of claim 2 in which the drawing agent is copper or a copper alloy and the agent for removing it is ammoniated ammonium persulfate solution.

4. The process of claim 1 in which the coating metal is brass.

5. The process of claim 3 in which the cord contacts a rinsing agent before coating with an organic adhesive.

6. The process of claim 5 in which the organic adhesive coated cord is passed through a heating zone.

7. The process of claim 6 in which the cord is brass-coated tire cord and the organic adhesive is a water based adhesive comprising diene rubber latex and resorcinol resin.

8. The process of claim 1 in which the coating metal is zinc.

* * * * *